United States Patent Office 3,483,090
Patented Dec. 9, 1969

3,483,090
PROCESS FOR PURIFYING
AMYLOGLUCOSIDASE
Richard Russell Barton, Elkhart, Ind., assignor to Miles Laboratories, Inc., Elkhart, Ind., a corporation of Indiana
No Drawing. Filed May 1, 1967, Ser. No. 634,822
Int. Cl. C07g 7/02
U.S. Cl. 195—66                              6 Claims

ABSTRACT OF THE DISCLOSURE

Transglucosidase impurity can be removed from amyloglucosidase solutions by mixing such solutions with a maleic anhydride copolymeric material to form a precipitate with transglucosidase and then separating the precipitate from the so-purified amyloglucosidase.

BACKGROUND AND PRIOR ART

Amyloglucosidase, an enzyme which has also been referred to as glucamylase, glucogenic enzyme, starch glucogenase, gamma-amylase and $\alpha$-1,4-glucan glucohydrase, is a well-known material which catalyzes the hydrolysis of starch to dextrose. This enzyme appears to aid in the formation of dextrose directly from starch without the production of intermediate products, such as higher sugars and soluble dextrins. This enzyme is also capable of catalyzing the hydrolysis of intermediate starch hydrolysis products to dextrose.

Amyloglucosidase is known to be prepared by fermentation processes employing certain strains of fungi belonging to the *Aspergillus niger* group and certain strains of Rhizopus species. Illustrative fungi are those of the species *Aspergillus niger*, *Aspergillus oryzae*, *Rhizopus delemar*, *Aspergillus phoenicis* and the like.

The fungal strains producing amyloglucosidase are also known to produce other enzymes, such as transglucosidase. Transglucosidase promotes the formation, particularly from maltose and glucose, of unfermentable carbohydrates. When transglucosidase is present as a contaminant in amyloglucosidase employed to catalyze the hydrolysis of starch to dextrose, lower yields of dextrose are obtained than if the transglucosidase were absent. The presence of transglucosidase in the usual amyloglucosidase preparations has been generally recognized and considerable work has been carried out to reduce and substantially eliminate the transglucosidase impurity in amyloglucosidase.

Prior art methods for removing transglucosidase from amyloglucosidase have employed clay, synthetic magnesium silicate, fuller's earth, and ion-exchange materials to selectively adsorb the transglucosidase. Selective precipitation of the transglucosidase impurity has also been employed. None of the prior art purification methods were commercially satisfactory for removal of substantial amounts of the transglucosidase impurity without also removing appreciable amounts of the desired amyloglucosidase product.

STATEMENT OF THE INVENTION

In accordance with the present invention, a process is provided for removing transglucosidase impurities from amyloglucosidase which comprises mixing an amyloglucosidase solution containing transglucosidase impurity with a solution of a copolymer of maleic anhydride to form a precipitate between the transglucosidase and the copolymeric material and then separating the precipitate from the so-purified amyloglucosidase. This process has the advantages of removing substantial amounts of transglucosidase without also removing appreciable amounts of amyloglucosidase.

DESCRIPTION OF THE INVENTION

The process of the present invention is useful for purifying amyloglucosidase in various forms. It can be in the form of aqueous whole cultures and fermentation beers known in the art. It can also be in the form of dried material which is then dissolved in aqueous media for use in the present process. The concentration of amyloglucosidase in the aqueous solution is not critical. As is known in the art, dilute solutions will require large quantities of liquid material to be processed in order to purify a given quantity of amyloglucosidase. The more concentrated solutions will enable a given quantity of amyloglucosidase to be purified with less effort and in a shorter period of time.

The copolymeric materials useful in the present invention are available from numerous sources. They are formed by a copolymerization reaction between about equimolar amounts of maleic anhydride and another substance, such as ethylene, styrene, methyl vinyl ether, and the like. The preferred materials are thus copolymers of maleic anhydride and an ethylenically unsaturated monomer copolymerizable therewith. The copolymers of ethylene and maleic anhydride are commercially available from Monsanto Chemical Co. under the trademark "EMA" as linear resins in the forms of the anhydride, free acid, and amide ammonium salt. The free acid and amide ammonium salt forms are soluble in water. The anhydride form is generally insoluble in water but conveniently dissolves with heating to produce the free acid form by hydrolysis. The copolymers of styrene and maleic anhydride are commercially available from Texas Butadiene and Chemical Co. under the trademark "SMA." They are insoluble in water but can be dissolved in dilute alkali with gentle heating. The copolymers of methyl vinyl ether and maleic anhydride are commercially available from General Aniline and Film Corp. under the trademark "GANTREZ." They are soluble in water and slowly hydrolyze to form the free acid.

In the practice of this invention an aqueous solution of amyloglucosidase is contacted with a solution of the maleic anhydride copolymer. The copolymer is generally employed in a solution concentration of about 1 weight percent, but other concentrations may be employed, if desired. The maleic anhydride copolymer is generally employed in an amount of at least about 200 weight parts copolymer per million weight parts of amyloglucosidase solution. Preferably, the maleic anhydride copolymer is employed in an amount of from about 800 to about 1000 weight parts per million weight parts of amyloglucosidase solution.

The process conditions for carrying out the present invention are generally not narrowly critical. Temperatures from about 0° C. to about 60° C. can be employed. At temperatures below about 0° C. the amyloglucosidase solutions will tend to freeze. At temperatures above about 60° C. the amyloglucosidase will become inactivated. Preferably, temperatures of from about 5° C. to about 30° C. are employed. The pH of the amyloglucosidase solution should also be in the range of from about 4.0 to about 5.0 when it is mixed with the maleic anhydride copolymer. It has been found that a mixing time of about 2 hours between the amyloglucosidase solution and the maleic anhydride copolymer is sufficient to precipitate the transglucosidase impurity. Mixing times shorter and longer than this may be necessary depending on the amount of the copolymer used and the amount of transglucosidase impurity to be removed.

The process of the present invention removes transglucosidase from amyloglucosidase with minimum loss of amyloglucosidase. Well-known methods are employed for determining amyloglucosidase content (defined in terms of activity units per ml.) of starting material and purified material to measure amyloglucosidase recover. Transglucosidase removal is determined by incubating a maltose solution with the amyloglucosidase purified by the present process and measuring the optical activity (specific rotation) of the resulting product. This specific rotation value is then compared with the specific rotation value obtained by incubating a maltose solution with amyloglucosidase which has not been purified by the present process. The specific rotation value obtained with purified material will be lower than the specific rotation value obtained with the unpurified material. The higher the specific rotation value of any given sample, the higher will be the transglucosidase content.

The methods for determining amyloglucosidase activity and transglucosidase activity are decreased below:

Amyloglucosidase activity

An aqueous solution is prepared containing 4.0 g. of soluble starch (moisture-free basis) and 5.6 ml. of 1.1 M acetate buffer, pH 4.2, per 100 ml. Exactly 50 ml. of the buffered starch solution is pipetted into a 100 ml. volumetric flask and equilibrated in a water bath at 60° C. for 15 minutes. Then 1.0 ml. of enzyme solution, properly diluted so that 20% to 30% hydrolysis will occur during incubation period, is added and mixed. After exactly 60 minutes of incubation in the water bath at 60° C., the solution is adjusted to a pink phenolphthalein end point by adding 2 N sodium hydroxide. The solution is then cooled to room temperature and diluted to volume with distilled water. Reducing sugar, calculated as dextrose, is determined on the diluted sample and on a blank solution treated in the same way but with no added enzyme. Dextrose content is conveniently determined by the well-known School method described in National Bureau of Standards Circular C–440, "Polarimetry, Saccharimetry and the Sugars," pp. 192–193 (1942). Amyloglucosidase activity is calculated from the formula:

$$A = \frac{S-B}{E}$$

where

A = amyloglucosidase activity, units per ml. of enzyme preparation.
S = reducing sugars in enzyme treated sample, grams per 100 ml. diluted sample.
B = reducing sugars in blank, grams per 100 ml. diluted sample.
E = amount of enzyme used, ml. per 100 ml. diluted sample.

Transglucosidase activity

A solution of maltose is prepared by dissolving 100.0 g. C.P. maltose in distilled water and diluting to 500 ml. A 50.0 ml. portion of this 20 percent (percent w./v.) maltose solution is then placed in a 100 ml. flask and diluted to 100 ml. with distilled water. To the flask containing a 10 percent (percent w./v.) maltose solution is added 5 ml. of 1.0 M acetate buffer, pH 4.0. After mixing, an amount of enzyme preparation containing 5.0 units of amyloglucosidase activity is added. The flask is placed in a 60° C. water bath and heated for 72 hours. At the end of this incubation period, the optical rotation of the sugar solution is measured by well-known techniques. The higher the specific rotation measured at 25° C., $[\alpha]_D^{25}$, the higher will be the transglucosidase activity or content of the enzyme preparation being tested.

The present invention will be further described in the following illustrative examples.

EXAMPLE 1

An aqueous amyloglucosidase solution was obtained by fermenting an aqueous corn mash with a fungal strain of the *Aspergillus niger* group and then filtering off the mycellium. The filtrate contained 8.65 amyloglucosidase activity units per ml. and had a pH of 4.0. A 1 weight percent aqueous solution of ethylene-maleic anhydride copolymer (EMA 31 marketed by Monsanto Chemical Company) was added to the amlyoglucosidase solution in an amount of 800 p.p.m. (weight parts copolymer per million weight parts of amylglucosidase solution). These two solutions were then mixed with agitation for 2 hours at about 20° C. during which time a precipitate formed. An inorganic filter aid was added to the mixture in an amount of 2 weight percent based on total weight of the mixture and the resultant mixture was filtered. This filtrate contained 8.0 amyloglucosidase activity units per ml. which represented a retention of 92.5 percent of amyloglucosidase activity. Transglucosidase activity was measured on the original amyloglucosidase solution prior to mixing with the copolymer and on the final filtrate after treatment with the copolymer. Specific rotation of the original amyloglucosidase solution was $[\alpha]_D^{25}$ 55.23°. Specific rotation of the purified amyloglucosidase solution was 53.80°. This significant reduction in optical rotation of the purified product indicates substantial removal of transglucosidase impurity.

EXAMPLE 2

The procedure of Example 1 was repeated using the ethylene-maleic anhydride copolymer in concentrations of 400, 600 and 1000 p.p.m. The results are shown in the following table.

| | Amyloglucosidase activity retention, percent | Specific rotation of product, degrees |
|---|---|---|
| Copolymer concentration, p.p.m.: | | |
| 400 | 97.7 | 54.07 |
| 600 | 97.7 | 53.93 |
| 1,000 | 84.8 | 53.77 |

These data clearly show substantial removal of transglucosidase impurity without appreciable loss of amyloglucosidase activity.

EXAMPLE 3

The procedure of Example 1 was repeated using a styrene-maleic anhydride copolymer having an average molecular weight of 2550 and marketed under the designation of SMA 1440 A by Texas Butadiene and Chemical Co. This copolymer was used at a concentration of 600 p.p.m. The purified product retained 94.7 percent of the amyloglucosidase activity and had a specific rotation of 54.5°.

EXAMPLE 4

The procedure of Example 1 was repeated using a styrene-maleic anhydride copolymer having an average molecular weight of 1600 and marketed under the designation of SMA 1000 A by Texas Butadiene and Chemical Co. This copolymer was used at a concentration of 800 p.p.m. The purified product retained 89 percent of the amyloglucosidase activity and had a specific rotation of 54.13°.

EXAMPLE 5

The procedure of Example 1 was repeated using a styrene-maleic anhydride copolymer having an average molecular weight of 400–600 and marketed under the designation SMA 4000 A by Texas Butadiene and Chemical Co. This copolymer was used at a concentration of 800 p.p.m. The purified product retained 91.7 percent of the amyloglucosidase activity and had a specific rotation of 54.67°.

EXAMPLE 6

The procedure of Example 1 was repeated using a methyl vinyl ether-maleic anhydride copolymer marketed under the designation GANTREZ AN139 by General Aniline and Film Corp. This copolymer was used at a concentration of 200 p.p.m. The purified product had a specific rotation of 54.40°.

In summary, transglucosidase impurity can be conveniently removed from amyloglucosidase preparations without appreciable loss of amyloglucosidase activity by treating the amyloglucosidase with a solution of a maleic anhydride copolymer to form a separable precipitate with the transglucosidase.

What is claimed is:

1. A process for removing transglucosidase impurities from amyloglucosidase which comprises mixing an amyloglucosidase solution containing transglucosidase impurity with a solution of a copolymer of maleic anhydride to form a precipitate between the transglucosidase and the copolymeric material and then separating the precipitate from the so-purified amyloglucosidase.

2. A process according to claim 1 wherein the copolymer of maleic anhydride is present in an amount of from about 800 to about 1000 parts by weight per million parts by weight of amyloglucosidase solution.

3. A process according to claim 1 wherein the pH of amyloglucosidase solution is from about 4.0 to about 5.0.

4. A process according to claim 1 wherein the copolymer is a copolymer of ethylene and maleic anhydride.

5. A process according to claim 1 wherein the copolymer is a copolymer of styrene and maleic anhydride.

6. A process according to claim 1 wherein the copolymer is a copolymer of methyl vinyl ether and maleic anhydride.

References Cited

UNITED STATES PATENTS

| | | | |
|---|---|---|---|
| 3,254,003 | 5/1966 | Croxall | 195—66 |
| 3,436,309 | 4/1969 | Ottinger et al. | 195—31 |

LIONEL M. SHAPIRO, Primary Examiner